United States Patent
Chen et al.

(10) Patent No.: US 11,948,064 B2
(45) Date of Patent: Apr. 2, 2024

(54) SYSTEM, METHOD, AND COMPUTER PROGRAM PRODUCT FOR CLEANING NOISY DATA FROM UNLABELED DATASETS USING AUTOENCODERS

(71) Applicant: Visa International Service Association, San Francisco, CA (US)

(72) Inventors: Qingguo Chen, Round Rock, TX (US); Yiwei Cai, Mercer Island, WA (US); Dan Wang, Cedar Park, TX (US); Peng Wu, College Station, TX (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/026,742

(22) PCT Filed: Sep. 2, 2022

(86) PCT No.: PCT/US2022/042433
§ 371 (c)(1),
(2) Date: Mar. 16, 2023

(87) PCT Pub. No.: WO2023/107164
PCT Pub. Date: Jun. 15, 2023

(65) Prior Publication Data
US 2024/0028874 A1    Jan. 25, 2024

Related U.S. Application Data

(60) Provisional application No. 63/287,225, filed on Dec. 8, 2021.

(51) Int. Cl.
*G06N 3/0455* (2023.01)
*G06N 3/09* (2023.01)

(52) U.S. Cl.
CPC ............. *G06N 3/0455* (2023.01); *G06N 3/09* (2023.01)

(58) Field of Classification Search
CPC ........ G06N 3/0455; G06N 3/09; G06N 3/045; G06N 3/088
See application file for complete search history.

(56) References Cited

U.S. PATENT DOCUMENTS

2019/0096038 A1* 3/2019 El-Khamy ............. G06T 5/002
2019/0227536 A1 7/2019 Cella et al.
(Continued)

FOREIGN PATENT DOCUMENTS

| CN | 107590778 A | 1/2018 |
| CN | 109978079 A | 7/2019 |
| CN | 113705699 A | 11/2021 |

OTHER PUBLICATIONS

Makhzani et al., "Adversarial Autoencoders", arXiv:1511.05644v2, May 25, 2016, pp. 1-16.
(Continued)

*Primary Examiner* — Samir A Ahmed
(74) *Attorney, Agent, or Firm* — The Webb Law Firm

(57) ABSTRACT

Methods, systems, and computer program products are provided for cleaning noisy data from unlabeled datasets using autoencoders. A method includes receiving training data including noisy samples and other samples. An autoencoder network is trained based on the training data to increase a first metric based on the noisy samples and to reduce a second metric based on the other samples. Unlabeled data including unlabeled samples is received. A plurality of third outputs is generated by the autoencoder network based on the plurality of unlabeled samples. For each respective unlabeled sample, a respective third metric is determined based on the respective unlabeled sample and a respective third output, and whether to label the respective (Continued)

unlabeled sample as noisy or clean is determined based on the respective third metric and a threshold. Each respective unlabeled sample determined to be labeled as noisy is cleaned.

20 Claims, 6 Drawing Sheets

(56) References Cited

U.S. PATENT DOCUMENTS

| | | |
|---|---|---|
| 2019/0273510 A1 | 9/2019 | Elkind et al. |
| 2020/0089650 A1 | 3/2020 | Sharma et al. |
| 2020/0210849 A1 | 7/2020 | Ben Kimon et al. |
| 2020/0320371 A1 | 10/2020 | Baker |
| 2021/0049418 A1 | 2/2021 | Zhao et al. |
| 2021/0241118 A1 | 8/2021 | Zarkov et al. |

OTHER PUBLICATIONS

McCaffrey, "Data Prep for Machine Learning: Normalization", Visual Studio Magazine, Aug. 4, 2020, 14 pages.

Zhang et al., "Robust Class-Specific Autoencoder for Data Cleaning and Classification in the Presence of Label Noise", Neural Processing Letters, 2018, 16 pages, Springer Science+Business Media, LLC, part of Springer Nature.

* cited by examiner

SYSTEM, METHOD, AND COMPUTER PROGRAM PRODUCT FOR CLEANING NOISY DATA FROM UNLABELED DATASETS USING AUTOENCODERS

CROSS REFERENCE TO RELATED APPLICATIONS

This application is the United States national phase of International Application No. PCT/US2022/042433 filed Sep. 2, 2022, and claims the benefit of U.S. Provisional Patent Application No. 63/287,225, filed on Dec. 8, 2021, the disclosures of which are hereby incorporated by reference in their entirety.

BACKGROUND

1. Technical Field

This disclosure relates generally to cleaning noisy data from unlabeled datasets and, in non-limiting embodiments or aspects, systems, methods, and computer program products for cleaning noisy data from unlabeled datasets using autoencoders.

2. Technical Considerations

Certain institutions have large amounts of data that may be used for machine learning tasks. For example, popular websites may have a large amount of data describing using behavior, application developers may have large amounts of data input from users, or financial institutions may have large amounts of data related to transactions. Such data may be input into machine learning models to train the models and/or to perform tasks (e.g., classification, prediction, scoring, etc.) based on the input.

However, if the data or a portion thereof is noisy, the data quality will be poor. As a result, the machine learning models using such data will perform poorly. For example, accuracy of such models may be decreased, training times for such models may increase, and/or the like. Identifying and/or cleaning noisy data samples from the data may be difficult. For example, the data may not be labeled and/or otherwise identified as noisy.

SUMMARY

Accordingly, provided are improved systems, methods, and computer program products for cleaning noisy data from unlabeled datasets using autoencoders.

According to non-limiting embodiments or aspects, provided is a computer-implemented method for cleaning noisy data from unlabeled datasets using autoencoders. A method may include receiving training data including a plurality of noisy samples labeled as noisy and a plurality of other samples not labeled as noisy. An autoencoder network may be trained based on the training data to increase a first metric based on the plurality of noisy samples and a plurality of first outputs generated by the autoencoder network using the plurality of noisy samples and to reduce a second metric based on the plurality of other samples and a plurality of second outputs generated by the autoencoder network using the plurality of other samples. Unlabeled data including a plurality of unlabeled samples may be received. A plurality of third outputs may be generated by the autoencoder network based on the plurality of unlabeled samples. For each respective unlabeled sample of the plurality of unlabeled samples, a respective third metric may be determined based on the respective unlabeled sample and a respective third output of the plurality of third outputs. For each respective unlabeled sample of the plurality of unlabeled samples, whether to label the respective unlabeled sample as noisy or clean may be determined based on the respective third metric and a threshold. For each respective unlabeled sample determined to be labeled as noisy, the respective unlabeled sample may be cleaned.

In some non-limiting embodiments or aspects, the plurality of other samples may include a plurality of clean samples labeled as clean.

In some non-limiting embodiments or aspects, the plurality of other samples may include a subset of the plurality of unlabeled samples.

In some non-limiting embodiments or aspects, the plurality of other samples may include a second plurality of unlabeled samples. The method may further include labeling the second plurality of unlabeled samples as clean.

In some non-limiting embodiments or aspects, the autoencoder network may include a min-max adversarial hybrid autoencoder.

In some non-limiting embodiments or aspects, training the autoencoder network may include training the autoencoder network to maximize a difference between the plurality of noisy samples and the plurality of first outputs and to minimize a difference between the plurality of other samples and the plurality of second outputs.

In some non-limiting embodiments or aspects, training the autoencoder network may include determining a negative mean squared error based on the plurality of noisy samples and the plurality of first outputs as a first component of loss and/or determining a mean squared error based on the plurality of other samples and the plurality of second outputs as a second component of loss.

In some non-limiting embodiments or aspects, the third metric may include a difference between each respective unlabeled sample and the respective third output. Additionally or alternatively, determining whether to label the respective unlabeled sample as noisy or clean may include determining to label the respective unlabeled sample as noisy if the difference exceeds the threshold or determining to label the respective unlabeled sample as clean if the difference does not exceed the threshold.

In some non-limiting embodiments or aspects, cleaning the respective unlabeled sample may include at least one of discarding the respective unlabeled sample, setting a respective flag indicating that the respective unlabeled sample is determined to be labeled as noisy, labeling the respective unlabeled sample as noisy, communicating a score based on the metric for the respective unlabeled sample, communicating report data based on determining whether to label each respective unlabeled sample as noisy or clean, and/or any combination thereof.

In some non-limiting embodiments or aspects, the plurality of noisy samples may include a plurality of declined transactions, the plurality of other samples may include a first plurality of approved transactions, and the plurality of unlabeled samples may include a second plurality of approved transactions. In some non-limiting embodiments or aspects, determining whether to label each respective unlabeled sample as noisy or clean may include determining whether to label each respective unlabeled sample as declined or approved, respectively. Additionally or alternatively, cleaning each respective unlabeled sample determined to be labeled as noisy may include discarding the respective unlabeled sample. In some non-limiting embodiments or aspects, a remaining plurality of unlabeled samples includes each respective unlabeled sample determined to be labeled as clean.

In some non-limiting embodiments or aspects, the method may further include retraining the autoencoder network to increase a further first metric based on the plurality of declined transactions and a further plurality of first outputs generated by the autoencoder network using the plurality of declined transactions and to reduce a further second metric based on the remaining plurality of unlabeled samples and a further plurality of second outputs generated by the autoencoder network using the remaining plurality of unlabeled samples.

In some non-limiting embodiments or aspects, receiving the training data may include receiving the training data from a user device. Additionally or alternatively, receiving the unlabeled data may include receiving the unlabeled data from the user device.

In some non-limiting embodiments or aspects, cleaning may include generating report data based on determining whether to label each respective unlabeled sample as noisy or clean and/or communicating the report data to the user device.

According to non-limiting embodiments or aspects, provided is a system for cleaning noisy data from unlabeled datasets using autoencoders. A system may include a data cleaning system configured to receive training data including a plurality of noisy samples labeled as noisy and a plurality of other samples not labeled as noisy; train an autoencoder network based on the training data to increase a first metric based on the plurality of noisy samples and a plurality of first outputs generated by the autoencoder network using the plurality of noisy samples and to reduce a second metric based on the plurality of other samples and a plurality of second outputs generated by the autoencoder network using the plurality of other samples; receive unlabeled data including a plurality of unlabeled samples; generate a plurality of third outputs by the autoencoder network based on the plurality of unlabeled samples; for each respective unlabeled sample of the plurality of unlabeled samples, determine a respective third metric based on the respective unlabeled sample and a respective third output of the plurality of third outputs; for each respective unlabeled sample of the plurality of unlabeled samples, determine whether to label the respective unlabeled sample as noisy or clean based on the respective third metric and a threshold; and for each respective unlabeled sample determined to be labeled as noisy, clean the respective unlabeled sample.

In some non-limiting embodiments or aspects, the system may further include an input data database configured to receive the training data from a user device, receive the unlabeled data from the user device, and communicate the training data and the unlabeled data to the data cleaning system.

In some non-limiting embodiments or aspects, cleaning may include generating report data based on determining whether to label each respective unlabeled sample as noisy or clean and communicating the report data.

In some non-limiting embodiments or aspects, the system may further include an output data database configured to receive the report data from the data cleaning system and communicate the report data to a user device.

In some non-limiting embodiments or aspects, the data cleaning system may be part of a transaction service provider system, and a user device may be part of an issuer system.

According to non-limiting embodiments or aspects, provided is a computer program product for cleaning noisy data from unlabeled datasets using autoencoders. A computer program product may include at least one non-transitory computer-readable medium including one or more instructions that, when executed by at least one processor, cause the at least one processor to: receive training data including a plurality of noisy samples labeled as noisy and a plurality of other samples not labeled as noisy; train an autoencoder network based on the training data to increase a first metric based on the plurality of noisy samples and a plurality of first outputs generated by the autoencoder network using the plurality of noisy samples and to reduce a second metric based on the plurality of other samples and a plurality of second outputs generated by the autoencoder network using the plurality of other samples; receive unlabeled data including a plurality of unlabeled samples; generate a plurality of third outputs by the autoencoder network based on the plurality of unlabeled samples; for each respective unlabeled sample of the plurality of unlabeled samples, determine a respective third metric based on the respective unlabeled sample and a respective third output of the plurality of third outputs; for each respective unlabeled sample of the plurality of unlabeled samples, determine whether to label the respective unlabeled sample as noisy or clean based on the respective third metric and a threshold; and for each respective unlabeled sample determined to be labeled as noisy, clean the respective unlabeled sample.

In some non-limiting embodiments or aspects, the plurality of noisy samples may include a plurality of declined transactions, the plurality of other samples may include a first plurality of approved transactions, and the plurality of unlabeled samples may include a second plurality of approved transactions.

Further non-limiting embodiments or aspects will be set forth in the following numbered clauses:

Clause 1: A computer-implemented method, comprising: receiving, with at least one processor, training data comprising a plurality of noisy samples labeled as noisy and a plurality of other samples not labeled as noisy; training, with at least one processor, an autoencoder network based on the training data to increase a first metric based on the plurality of noisy samples and a plurality of first outputs generated by the autoencoder network using the plurality of noisy samples and to reduce a second metric based on the plurality of other samples and a plurality of second outputs generated by the autoencoder network using the plurality of other samples; receiving, with at least one processor, unlabeled data comprising a plurality of unlabeled samples; generating, with at least one processor, a plurality of third outputs by the autoencoder network based on the plurality of unlabeled samples; for each respective unlabeled sample of the plurality of unlabeled samples, determining, with at least one processor, a respective third metric based on the respective unlabeled sample and a respective third output of the plurality of third outputs; for each respective unlabeled sample of the plurality of unlabeled samples, determining, with at least one processor, whether to label the respective unlabeled sample as noisy or clean based on the respective third metric and a threshold; and for each respective unlabeled sample determined to be labeled as noisy, cleaning, with at least one processor, the respective unlabeled sample.

Clause 2: The method of clause 1, wherein the plurality of other samples comprises a plurality of clean samples labeled as clean.

Clause 3: The method of clause 1 or 2, wherein the plurality of other samples comprises a subset of the plurality of unlabeled samples.

Clause 4: The method of any of clauses 1-3, wherein the plurality of other samples comprises a second plurality of unlabeled samples, the method further comprising: labeling, with at least one processor, the second plurality of unlabeled samples as clean.

Clause 5: The method of any of clauses 1-4, wherein the autoencoder network comprises a min-max adversarial hybrid autoencoder.

Clause 6: The method of any of clauses 1-5, wherein training the autoencoder network comprises training the autoencoder network to maximize a difference between the plurality of noisy samples and the plurality of first outputs and to minimize a difference between the plurality of other samples and the plurality of second outputs.

Clause 7: The method of any of clauses 1-6, wherein training the autoencoder network comprises: determining a negative mean squared error based on the plurality of noisy samples and the plurality of first outputs as a first component of loss; and determining a mean squared error based on the plurality of other samples and the plurality of second outputs as a second component of loss.

Clause 8: The method of any of clauses 1-7, wherein the third metric comprises a difference between each respective unlabeled sample and the respective third output, and wherein determining whether to label the respective unlabeled sample as noisy or clean comprises: determining to label the respective unlabeled sample as noisy if the difference exceeds the threshold; or determining to label the respective unlabeled sample as clean if the difference does not exceed the threshold.

Clause 9: The method of any of clauses 1-8, wherein cleaning the respective unlabeled sample comprises at least one of: discarding the respective unlabeled sample; setting a respective flag indicating that the respective unlabeled sample is determined to be labeled as noisy; labeling the respective unlabeled sample as noisy; communicating a score based on the metric for the respective unlabeled sample; communicating report data based on determining whether to label each respective unlabeled sample as noisy or clean; or any combination thereof.

Clause 10: The method of any of clauses 1-9, wherein the plurality of noisy samples comprises a plurality of declined transactions, the plurality of other samples comprises a first plurality of approved transactions, and the plurality of unlabeled samples comprises a second plurality of approved transactions, wherein determining whether to label each respective unlabeled sample as noisy or clean comprises determining whether to label each respective unlabeled sample as declined or approved, respectively, wherein cleaning each respective unlabeled sample determined to be labeled as noisy comprises discarding the respective unlabeled sample, and wherein a remaining plurality of unlabeled samples comprises each respective unlabeled sample determined to be labeled as clean.

Clause 11: The method of any of clauses 1-10, further comprising: retraining, with at least one processor, the autoencoder network to increase a further first metric based on the plurality of declined transactions and a further plurality of first outputs generated by the autoencoder network using the plurality of declined transactions and to reduce a further second metric based on the remaining plurality of unlabeled samples and a further plurality of second outputs generated by the autoencoder network using the remaining plurality of unlabeled samples.

Clause 12: The method of any of clauses 1-11, wherein receiving the training data comprises receiving the training data from a user device; and wherein receiving the unlabeled data comprises receiving the unlabeled data from the user device.

Clause 13: The method of any of clauses 1-12, wherein cleaning comprises: generating report data based on determining whether to label each respective unlabeled sample as noisy or clean; and communicating the report data to the user device.

Clause 14: A system, comprising: a data cleaning system configured to: receive training data comprising a plurality of noisy samples labeled as noisy and a plurality of other samples not labeled as noisy; train an autoencoder network based on the training data to increase a first metric based on the plurality of noisy samples and a plurality of first outputs generated by the autoencoder network using the plurality of noisy samples and to reduce a second metric based on the plurality of other samples and a plurality of second outputs generated by the autoencoder network using the plurality of other samples; receive unlabeled data comprising a plurality of unlabeled samples; generate a plurality of third outputs by the autoencoder network based on the plurality of unlabeled samples; for each respective unlabeled sample of the plurality of unlabeled samples, determine a respective third metric based on the respective unlabeled sample and a respective third output of the plurality of third outputs; for each respective unlabeled sample of the plurality of unlabeled samples, determine whether to label the respective unlabeled sample as noisy or clean based on the respective third metric and a threshold; and for each respective unlabeled sample determined to be labeled as noisy, clean the respective unlabeled sample.

Clause 15: The system of clause 14, further comprising: an input data database configured to: receive the training data from a user device receive the unlabeled data from the user device; and communicate the training data and the unlabeled data to the data cleaning system.

Clause 16: The system of clause 14 or 15, wherein cleaning comprises generating report data based on determining whether to label each respective unlabeled sample as noisy or clean and communicating the report data.

Clause 17: The system of any of clauses 14-16, further comprising: an output data database configured to: receive the report data from the data cleaning system; and communicate the report data to a user device.

Clause 18: The system of any of clauses 14-17, wherein the data cleaning system comprises part of a transaction service provider system, and wherein a user device comprises part of an issuer system.

Clause 19: A computer program product comprising at least one non-transitory computer-readable medium including one or more instructions that, when executed by at least one processor, cause the at least one processor to: receive training data comprising a plurality of noisy samples labeled as noisy and a plurality of other samples not labeled as noisy; train an autoencoder network based on the training data to increase a first metric based on the plurality of noisy samples and a plurality of first outputs generated by the autoencoder network using the plurality of noisy samples and to reduce a second metric based on the plurality of other samples and a plurality of second outputs generated by the autoencoder network using the plurality of other samples; receive unlabeled data comprising a plurality of unlabeled samples; generate a plurality of third outputs by the autoencoder network based on the plurality of unlabeled samples; for each respective unlabeled sample of the plurality of unlabeled samples, determine a respective third metric based on the respective unlabeled sample and a respective third output of the plurality of third outputs; for each respective unlabeled sample of the plurality of unlabeled samples, determine whether to label the respective unlabeled sample as noisy or clean based on the respective third metric and a threshold; and for each respective unlabeled sample determined to be labeled as noisy, clean the respective unlabeled sample.

Clause 20: The computer program product of clause 19, wherein the plurality of noisy samples comprises a plurality of declined transactions, the plurality of other samples comprises a first plurality of approved transactions, and the plurality of unlabeled samples comprises a second plurality of approved transactions.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure.

BRIEF DESCRIPTION OF THE DRAWINGS

Additional advantages and details are explained in greater detail below with reference to the non-limiting, exemplary embodiments that are illustrated in the accompanying schematic figures, in which.

DETAILED DESCRIPTION

Figure 1:
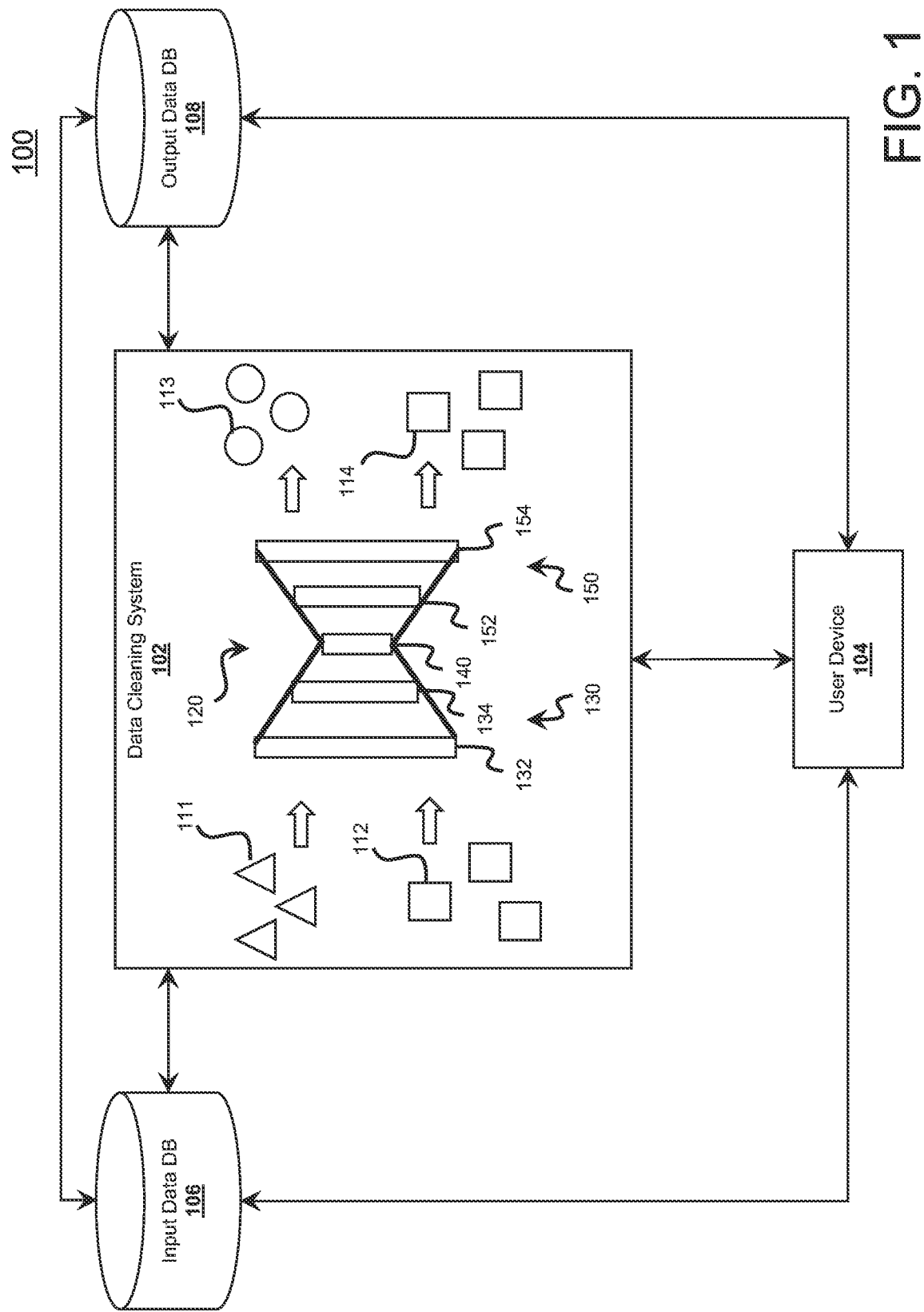
FIG. 1 is a schematic diagram of a system for cleaning noisy data from unlabeled datasets using autoencoders according to some non-limiting embodiments or aspects.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the term "acquirer institution" may refer to an entity licensed and/or approved by a transaction service provider to originate transactions (e.g., payment transactions) using a payment device associated with the transaction service provider. The transactions the acquirer institution may originate may include payment transactions (e.g., purchases, original credit transactions (OCTs), account funding transactions (AFTs), and/or the like). In some non-limiting embodiments or aspects, an acquirer institution may be a financial institution, such as a bank. As used herein, the term "acquirer system" may refer to one or more computing devices operated by or on behalf of an acquirer institution, such as a server computer executing one or more software applications.

As used herein, the term "account identifier" may include one or more primary account numbers (PANs), tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases, and/or the like) such that they may be used to conduct a transaction without directly using the original account identifier. In some examples, an original account identifier, such as a PAN, may be associated with a plurality of tokens for different individuals or purposes.

As used herein, the term "communication" may refer to the reception, receipt, transmission, transfer, provision, and/or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the terms "electronic wallet" and "electronic wallet application" refer to one or more electronic devices and/or software applications configured to initiate and/or conduct payment transactions. For example, an electronic wallet may include a mobile device executing an electronic wallet application, and may further include server-side software and/or databases for maintaining and providing transaction data to the mobile device. An "electronic wallet provider" may include an entity that provides and/or maintains an electronic wallet for a customer, such as Google Pay®, Android Pay®, Apple Pay®, Samsung Pay®, and/or other like electronic payment systems. In some non-limiting examples, an issuer bank may be an electronic wallet provider.

As used herein, the term "issuer institution" may refer to one or more entities, such as a bank, that provide accounts to customers for conducting transactions (e.g., payment transactions), such as initiating credit and/or debit payments. For example, an issuer institution may provide an account identifier, such as a PAN, to a customer that uniquely identifies one or more accounts associated with that customer. The account identifier may be embodied on a portable financial device, such as a physical financial instrument, e.g., a payment card, and/or may be electronic and used for electronic payments. The term "issuer system" refers to one or more computer devices operated by or on behalf of an issuer institution, such as a server computer executing one or more software applications. For example, an issuer system may include one or more authorization servers for authorizing a transaction.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, near-field communication (NFC) receivers, radio frequency identification (RFID) receivers, and/or other contactless transceivers or receivers, contact-based receivers, payment terminals, computers, servers, input devices, and/or other like devices that can be used to initiate a payment transaction.

As used herein, the term "payment device" may refer to a portable financial device, an electronic payment device, a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a cellular phone, an electronic wallet mobile application, a PDA, a pager, a security card, a computing device, an access card, a wireless terminal, a transponder, and/or the like. In some non-limiting embodiments or aspects, the payment device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like, operated by or on behalf of a payment gateway.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

Non-limiting embodiments or aspects of the disclosed subject matter are directed to systems, methods, and computer program products for cleaning noisy data from unlabeled datasets using autoencoders. For example, non-limiting embodiments or aspects of the disclosed subject matter provide using training data including some noisy samples labeled as noisy and other samples not labeled as noisy to train an autoencoder network (e.g., a min-max adversarial hybrid autoencoder) to increase a first metric based on (e.g., difference between) the noisy samples and first outputs generated based thereon and to reduce a second metric based on (e.g., difference between) the other samples and second outputs generated based thereon so that, when unlabeled data is received, the trained autoencoder network may generate third outputs based thereof and determine whether each unlabeled sample is noisy based on a third metric (e.g., difference between each respective unlabeled sample and the respective third output based thereof). Such embodiments or aspects provide techniques and systems that enable identification of unlabeled samples as noisy (or clean) and/or that enable cleaning of noisy samples. Accordingly, data quality is improved due to the identification and/or cleaning of noisy samples from the data. Additionally, performance of downstream machine learning models is improved (e.g., accuracy may be increased, training times may be decreased, and/or the like) by using the cleaned data. Moreover, the min-max adversarial hybrid autoencoder enables functionality that is not possible with traditional autoencoders. For example, the min-max adversarial hybrid autoencoder may enable labeling data as noisy (or clean), assessing data quality, and/or cleaning data.

For the purpose of illustration, in the following description, while the presently disclosed subject matter is described with respect to systems, methods, and computer program products for cleaning noisy data from unlabeled datasets using autoencoders, e.g., for transaction data and handwriting sample data, one skilled in the art will recognize that the disclosed subject matter is not limited to the illustrative embodiments. For example, the systems, methods, and computer program products described herein may be used with a wide variety of settings, such as cleaning noisy data from unlabeled datasets using autoencoders for any suitable type of data, e.g., data describing using behavior on websites, data input from users into applications, and/or the like.

FIG. 1 depicts a system 100 for cleaning noisy data from unlabeled datasets using autoencoders according to some non-limiting embodiments or aspects. As shown in FIG. 1, system 100 includes data cleaning system 102, user device 104, input data database 106, and output data database 108.

Data cleaning system 102 may include one or more devices capable of receiving information from and/or communicating information to user device 104, input data database 106, and/or output data database 108. For example, data cleaning system 102 may include a computing device, such as a server, a group of servers, and/or other like devices. In some non-limiting embodiments or aspects, data cleaning system 102 may be in communication with a data storage device, which may be local or remote to data cleaning system 102. In some non-limiting embodiments or aspects, data cleaning system 102 may be capable of receiving information from, storing information in, communicating information to, or searching information stored in the data storage device. In some non-limiting embodiments or aspects, data cleaning system 102 may be associated with a transaction service provider, as described herein.

User device 104 may include one or more devices capable of receiving information from and/or communicating information to data cleaning system 102, input data database 106, and output data database 108. For example, user device 104 may include a computing device, such as a mobile device, a portable computer, a desktop computer, and/or other like devices.

Input data database 106 may include one or more devices capable of receiving information from and/or communicating information to data cleaning system 102, user device 104, and/or output data database 108. For example, input data database 106 may include a computing device, such as a server, a group of servers, and/or other like devices. In some non-limiting embodiments or aspects, input data database 106 may be in communication with a data storage device, which may be local or remote to input data database 106. In some non-limiting embodiments or aspects, input data database 106 may be capable of receiving information from, storing information in, communicating information to, or searching information stored in the data storage device. In some non-limiting embodiments or aspects, input data database 106 may be associated with (e.g., a part of) data cleaning system 102.

Output data database 108 may include one or more devices capable of receiving information from and/or communicating information to data cleaning system 102, user device 104, and/or input data database 106. For example, output data database 108 may include a computing device, such as a server, a group of servers, and/or other like devices. In some non-limiting embodiments or aspects, output data database 108 may be in communication with a data storage device, which may be local or remote to output data database 108. In some non-limiting embodiments or aspects, output data database 108 may be capable of receiving information from, storing information in, communicating information to, or searching information stored in the data storage device. In some non-limiting embodiments or aspects, output data database 108 may be associated with (e.g., a part of) data cleaning system 102. Additionally or alternatively, in some non-limiting embodiments or aspects, input data database 106 and output data database 108 may be implemented within a single database.

In some non-limiting embodiments or aspects, data cleaning system 102 may include autoencoder network 120. For example, autoencoder network 120 may include encoder network 130, latent layer 140, and decoder network 150. In some non-limiting embodiments, encoder network 130 may include input layer 132 and/or at least one hidden layer 134. Additionally or alternatively, decoder network 150 may include at least one hidden layer 152 and output layer 154. In some non-limiting embodiments or aspects, data cleaning system 102 may receive (e.g., from input data database 106 and/or user device 104) data, which may include noisy samples 111 and/or clean samples 112. The data (e.g., noisy samples 111 and/or clean samples 112) may be input into autoencoder network 120 to generate outputs, which may include noisy reconstructed samples 113 and/or clean reconstructed samples 114, respectively. For example, after autoencoder network 120 is trained, a metric based on (e.g., difference between) noisy samples 111 and noisy reconstructed samples 113 may be increased (e.g., maximized)

and/or a metric based on (e.g., difference between) clean samples 112 and clean reconstructed samples 114 may be reduced (e.g., minimized), as described herein. Based on the respective metrics, data cleaning system 102 may determine whether each respective input sample (e.g., noisy sample 111 or clean sample 112) is noisy or clean, respectively, as described herein. Additionally or alternatively, data cleaning system 102 may clean (e.g., discard, set a flag associated with, label, score, report, and/or the like) each noisy sample 111, as described herein. In some non-limiting embodiments or aspects, data cleaning system 102 may communicate (e.g., to output data database 108 and/or user device 104) the outputs (noisy reconstructed samples 113 and/or clean reconstructed samples 114), cleaned data (e.g., clean samples 112 after discarding noisy sample 111), a report based on determining whether each input sample is noisy or clean, and/or any combination thereof.

The number and arrangement of systems and devices shown in FIG. 1 are provided as an example. There may be additional systems and/or devices, fewer systems and/or devices, different systems and/or devices, and/or differently arranged systems and/or devices than those shown in FIG. 1. Furthermore, two or more systems or devices shown in FIG. 1 may be implemented within a single system or device, or a single system or device shown in FIG. 1 may be implemented as multiple, distributed systems or devices. Additionally or alternatively, a set of systems (e.g., one or more systems) or a set of devices (e.g., one or more devices) of system 100 may perform one or more functions described as being performed by another set of systems or another set of devices of system 100.

Figure 2:
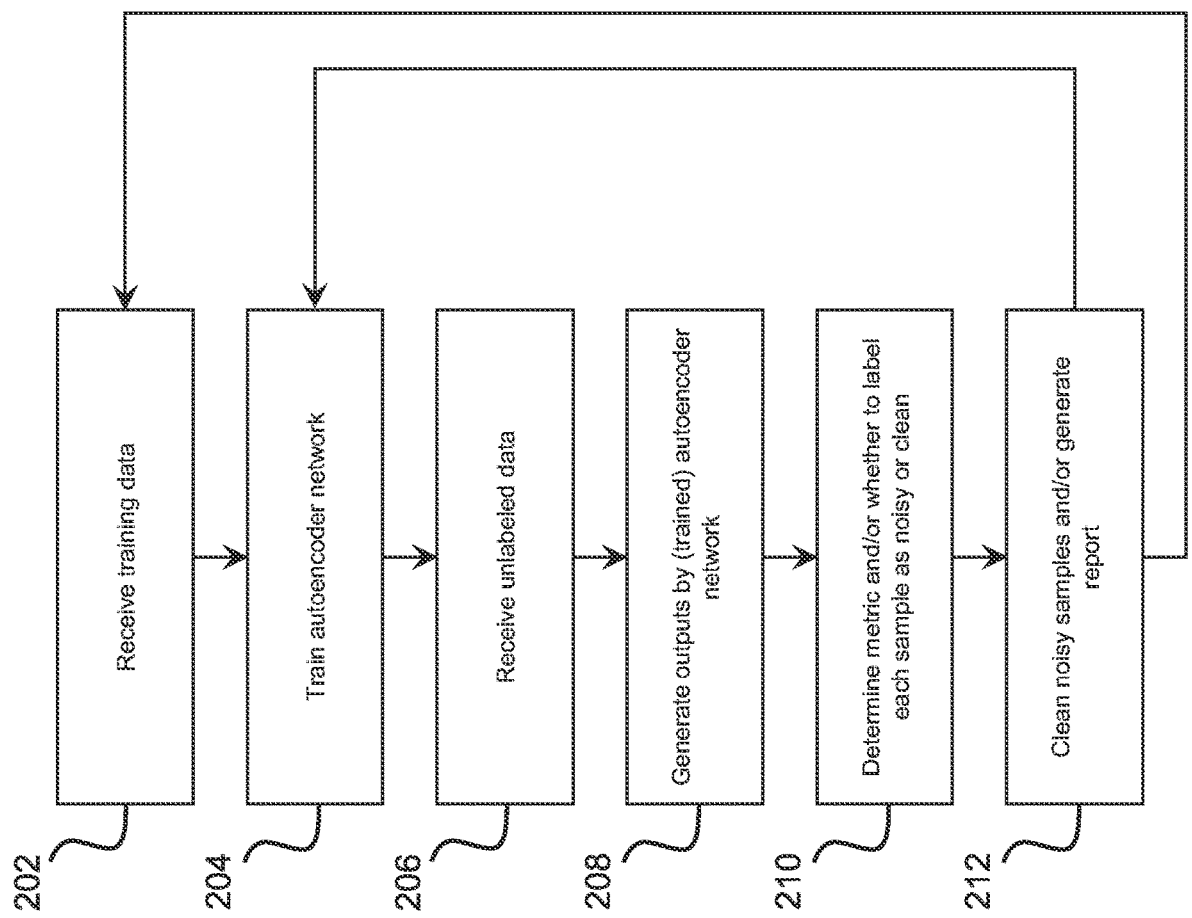
FIG. 2 is a flow diagram for a method for cleaning noisy data from unlabeled datasets using autoencoders according to some non-limiting embodiments or aspects.

Referring now to FIG. 2, shown is a process 200 for cleaning noisy data from unlabeled datasets using autoencoders according to some non-limiting embodiments or aspects. The steps shown in FIG. 2 are for example purposes only. It will be appreciated that additional, fewer, different, and/or a different order of steps may be used in non-limiting embodiments or aspects. In some non-limiting embodiments or aspects, one or more of the steps of process 200 may be performed (e.g., completely, partially, and/or the like) by data cleaning system 102 (e.g., one or more devices of data cleaning system 102). In some non-limiting embodiments or aspects, one or more of the steps of process 200 may be performed (e.g., completely, partially, and/or the like) by another system, another device, another group of systems, or another group of devices, separate from or including data cleaning system 102, such as user device 104, input data database 106, and output data database 108.

As shown in FIG. 2, at step 202, process 200 may include receiving training data. For example, data cleaning system 102 may receive training data from input data database 106 and/or user device 104. In some non-limiting embodiments or aspects, user device 104 may communicate the training data to input data database 106 (e.g., before data cleaning system 102 receives training data from input data database 106). In some non-limiting embodiments or aspects, user device 104 may communicate the training data to data cleaning system 102. In some non-limiting embodiments or aspects, input data database 106 may communicate the training data to data cleaning system 102.

In some non-limiting embodiments or aspects, the training data may include a plurality of noisy samples 111 labeled as noisy and a plurality of other samples not labeled as noisy. For example, the other samples may include a plurality of clean samples 112, which may be labeled as clean. Additionally or alternatively, the other samples may include a plurality of unlabeled samples. In some non-limiting embodiments or aspects, data cleaning system 102 may label the (subset of) unlabeled samples of the training data as clean (e.g., for training).

In some non-limiting embodiments or aspects, data cleaning system 102 may receive (e.g., from input data database 106 and/or user device 104) input data including a plurality of noisy samples labeled as noisy and a plurality of unlabeled samples. Data cleaning system 102 may divide the input data into training data and remaining data. For example, the training data may include the noisy samples (e.g., all of the samples labeled as noisy) and a subset of the unlabeled samples. Additionally or alternatively, data cleaning system 102 may save (e.g., store) the remaining unlabeled samples (e.g., as unlabeled data) for use after training autoencoder network 120, as described herein. In some non-limiting embodiments or aspects, data cleaning system 102 may label the (subset of) the unlabeled samples of the training data as clean (e.g., for training).

As shown in FIG. 2, at step 204, process 200 may include training an autoencoder network. For example, data cleaning system 102 may train autoencoder network 120 based on the training data. In some non-limiting embodiments or aspects, data cleaning system 102 may train autoencoder network 120 based on the training data to increase a first metric based on noisy samples 111 and first outputs (e.g., noisy reconstructed samples 113 generated by autoencoder network 120 using noisy samples 111 as input) and to reduce a second metric based on the other samples (e.g., clean samples 112) and second outputs (e.g., clean reconstructed samples 114 generated by autoencoder network 120 using the other samples as input). Alternatively, data cleaning system 102 may train autoencoder network 120 to decrease the first metric and increase the second metric, depending on the type of metrics being used.

In some non-limiting embodiments or aspects, each metric (e.g., first metric and second metric) may be the difference between the respective input (e.g., noisy sample 111 or clean sample 112) and the respective output (e.g., noisy reconstructed sample 113 or clean reconstructed sample 114, respectively). In some non-limiting embodiments or aspects, each metric may be score (e.g., similarity score and/or the like) based on the respective input and the respective output.

In some non-limiting embodiments or aspects, autoencoder network 120 may include a new type of autoencoder network herein referred to as a min-max adversarial hybrid autoencoder. A min-max adversarial hybrid autoencoder may include an autoencoder network with a hybrid (e.g., dual) objective function to increase (e.g., maximize) a first metric based on (e.g., difference between) noisy samples 111 and first outputs based thereon (e.g., noisy reconstructed samples 113) and reduce (e.g., minimize) a second metric based on (e.g., difference between) the other samples (e.g., clean samples 112) and second outputs based thereof (e.g., clean reconstructed samples 114). For example, the objective function for the min-max adversarial hybrid autoencoder may be represented by the following equation:

$$F^* = \mathrm{argmax}_F \|X_n - F(X_n)\|_D + \mathrm{argmin}_F \|X_c - F(X_c)\|_D,$$

wherein D is the metric, $X_n$ is the plurality of noisy samples, $X_c$ is the plurality of other samples, $F(X_n)$ is the output of autoencoder network 120 for the noisy samples, $F(X_c)$ is the output of autoencoder network 120 for the other/clean samples, F is a shorthand notation for the function that transforms the inputs of autoencoder network 120 to the outputs, and F* is F with parameters to satisfy the objection function. Thus, in some non-limiting embodiments or aspects, data cleaning system 102 may train autoencoder network 120 (e.g., the min-max adversarial hybrid autoencoder) to maximize a difference between the noisy samples 111 and noisy reconstructed samples 113 and to minimize a difference between clean samples 112 and clean reconstructed samples 114.

In some non-limiting embodiments or aspects, the loss for autoencoder network 120 (e.g., the min-max adversarial hybrid autoencoder) may be determined differently based on whether the input is noisy (e.g., noisy samples 111) or unlabeled/clean (e.g., clean samples 112). For example, during training of autoencoder network 120, data cleaning system 102 may determine a negative mean squared error based on noisy samples 111 and outputs generated based thereon (e.g., noisy reconstructed samples 113) as loss (e.g., a first component of loss). Additionally or alternatively, data cleaning system 102 may determine a (positive) mean squared error based on the other samples (e.g., clean samples 112) and outputs generated based thereon (e.g., clean reconstructed samples 114) as loss (e.g., a second component of loss). Accordingly, in some non-limiting embodiments or aspects, data cleaning system 102 may train autoencoder network 120 based on the training data, the above objective function, and the above determinations of loss.

In some non-limiting embodiments or aspects, training may include inputting (e.g., by data cleaning system 102) each respective input sample (e.g., each noisy sample 111 and/or each other sample/clean sample 112) into autoencoder network 120 to generate a respective output (e.g., a respective noisy reconstructed sample 113 or a respective clean reconstructed sample 114). A respective (component of) loss may be determined based on each respective input sample and each respective output. The loss (or each component thereof) may be back-propagated through autoencoder network 120 to update the parameters (e.g., weights) thereof. This training process may be repeated until a termination condition is satisfied. For example, a termination condition may include a target number of epochs, a target loss value, a target accuracy, and/or the like.

As shown in FIG. 2, at step 206, process 200 may include receiving unlabeled data. For example, data cleaning system 102 may receive unlabeled data from input data database 106 and/or user device 104. In some non-limiting embodiments or aspects, user device 104 may communicate the unlabeled data to input data database 106 (e.g., before data cleaning system 102 receives unlabeled data from input data database 106). In some non-limiting embodiments or aspects, user device 104 may communicate the unlabeled data to data cleaning system 102. In some non-limiting embodiments or aspects, input data database 106 may communicate the unlabeled data to data cleaning system 102. In some non-limiting embodiments or aspects, the unlabeled data may include a plurality of unlabeled samples.

In some non-limiting embodiments or aspects, as described above, data cleaning system 102 may receive (e.g., from input data database 106 and/or user device 104) input data including a plurality of noisy samples labeled as noisy and a plurality of unlabeled samples. Data cleaning system 102 may divide the input data into training data and remaining data, as described herein. For example, the remaining unlabeled samples (e.g., after data cleaning system separates the training data from the input data) may be used as the unlabeled data.

As shown in FIG. 2, at step 208, process 200 may include generating outputs by the autoencoder network. For example, data cleaning system 102 may input each respective unlabeled sample into autoencoder network 120 to generate a respective output (e.g., a respective noisy reconstructed sample 113 or a respective clean reconstructed sample 114) based on the unlabeled sample.

In some non-limiting embodiments or aspects, input layer 132 of autoencoder network 120 may receive each respective unlabeled sample as input. Each respective input may be forward-propagated from input layer 132 through hidden layer(s) 134 to transform the respective input into a latent representation (e.g., a vector in a latent space, which may be a compressed representation of the respective input) at the latent layer 140. Additionally or alternatively, the latent representation may be forward-propagated from latent layer 140 through hidden layer(s) 152 to transform the respective latent representation into an output (e.g., a reconstruction of the respective input based on the latent representation) at the output layer 154.

As shown in FIG. 2, at step 210, process 200 may include determining a metric and/or determining whether to label each input sample as noisy or clean. For example, data cleaning system 102 may determine a metric based on (e.g., difference between) each respective unlabeled sample and the respective output (e.g., noisy reconstructed sample 113 and/or clean reconstructed sample 114) generated based thereon. Additionally or alternatively, data cleaning system 102 may determine whether to label each unlabeled sample as noisy or clean based on the metric and/or based on a difference between each respective unlabeled sample and the respective output generated based thereon. For example, data cleaning system 102 may determine whether to label each unlabeled sample as noisy or clean based on the metric and a threshold.

In some non-limiting embodiments or aspects, the metric may include a difference between each respective unlabeled sample and the respective output (e.g., noisy reconstructed sample 113 and/or clean reconstructed sample 114) generated based thereon. For example, data cleaning system 102 may determine the difference between each respective unlabeled sample and the respective output generated based thereon. Additionally or alternatively, data cleaning system 102 may determine whether to label the respective unlabeled sample as noisy or clean based on the metric (e.g., difference) satisfying a threshold. For example, data cleaning system 102 may determine to label the respective unlabeled sample as noisy if the difference satisfies (e.g., exceeds) a threshold, or data cleaning system 102 may determine to label the respective unlabeled sample as clean if the difference does not satisfy (e.g., does not exceed) the threshold.

As shown in FIG. 2, at step 212, process 200 may include cleaning the (unlabeled) data and/or generating a report based on the (unlabeled) data. For example, data cleaning system 102 may clean the unlabeled data. Additionally or alternatively, data cleaning system 102 may generate a report based on the unlabeled data.

In some non-limiting embodiments or aspects, data cleaning system 102 may clean the unlabeled samples by discarding noisy samples 111 (e.g., based on such samples being labeled as noisy, as described herein). As such, only clean samples 112 may remain.

In some non-limiting embodiments or aspects, data cleaning system 102 may set a flag indicating each noisy sample 111 has been determined to be labeled as noisy. As such, all noisy samples 111 in the unlabeled data may be identified as noisy.

In some non-limiting embodiments or aspects, data cleaning system 102 may label each noisy sample 111 as noisy.

In some non-limiting embodiments or aspects, data cleaning system 102 may communicate a score based on the metric (e.g., the difference) for each noisy sample 111 and/or for each sample in the unlabeled data (e.g., all noisy samples 111 and clean samples 112). In some non-limiting embodiments or aspects, the respective score for a respective sample may be the metric. In some non-limiting embodiments or aspects, the respective score for a respective sample may be a normalized value based on the metric (e.g., a value between 0 and 1, wherein the score is normalized such that the highest metric for any of the samples is equal to 1).

In some non-limiting embodiments or aspects, data cleaning system 102 may communicate report data based on determining whether to label each respective unlabeled sample as noisy or clean. For example, data cleaning system 102 may generate a report with an indication for each sample of the unlabeled data as noisy or clean. Additionally or alternatively, the report may include the metric (e.g., difference) and/or the score associated with each respective sample of the unlabeled data. Additionally or alternatively, the report may include an overall score (e.g., an average of the metric, an average of the score, a median metric, a median score, a maximum metric, a maximum score, and/or the like) for the unlabeled data.

In some non-limiting embodiments or aspects, data cleaning system 102 may communicate (e.g., to output data database 108 and/or user device 104) the outputs (noisy reconstructed samples 113 and/or clean reconstructed samples 114), cleaned data (e.g., clean samples 112 after discarding noisy sample 111), a report based on determining whether each input sample is noisy or clean, and/or any combination thereof.

In some non-limiting embodiments or aspects, the cleaned data may be used (e.g., by user device 104, another system, another device, another group of systems, or another group of devices, separate from or including data cleaning system 102) to train a separate machine learning model and/or to perform a task (e.g., classification, prediction, scoring, etc.) based on the cleaned data.

In some non-limiting embodiments or aspects, data cleaning system 102 may retrain autoencoder network 120 based on the training data and the cleaned data. For example, if data cleaning system 102 labels each sample of the unlabeled data as either clean or noisy, the samples labeled as noisy may be added to the training data as additional noisy samples 111 and the samples labeled as clean may be added to the training data as additional clean samples 112. Additionally or alternatively, noisy reconstructed samples 113 and/or clean reconstructed samples 114 generated based on the unlabeled data may be added to the training data as additional noisy samples 111 and/or additional clean samples 112, respectively.

In some non-limiting embodiments or aspects, the plurality of noisy samples may include a plurality of declined transactions. Additionally or alternatively, the plurality of other samples may include a first plurality of approved transactions (which may include true (e.g., rightfully) approved transactions and/or false (e.g., wrongfully) approved transactions), and/or the plurality of unlabeled samples may include a second plurality of approved transactions (which may include true approved transactions and/or false approved transactions). Data cleaning system 102 may receive the plurality of declined transactions, the first plurality of approved transactions, and/or the second plurality of approved transactions, as described herein. Data cleaning system 102 may train autoencoder network 120 based on the plurality of declined transactions (e.g., noisy samples) and the first plurality of approved transactions (e.g., other/clean samples), as described herein. Additionally or alternatively, data cleaning system 102 may input each transaction of the second plurality of approved transactions into (trained) autoencoder network 120 to generate outputs based thereon, and/or data cleaning system 102 may determine a metric based on (e.g., difference between) each transaction (of the second plurality of approved transactions) and the output generated based thereon, as described herein. Data cleaning system 102 may determine whether to label each respective unlabeled sample as noisy (e.g., false approved, i.e., should have been declined) or clean (e.g., true approved, i.e., should have been approved) based on the respective metric and a threshold, as described herein. In some non-limiting embodiments or aspects, data cleaning system 102 may clean each respective transaction of the second plurality of unlabeled samples that data cleaning system 102 determined to be labeled as noisy by discarding the respective transaction, as described herein. Accordingly, a remaining plurality of transactions may include each respective transaction (of the second plurality of approved transactions) that data cleaning system 102 determined to be labeled as clean, as described herein.

In some non-limiting embodiments or aspects, data cleaning system 102 may retrain the autoencoder network to increase a further first metric based on the plurality of declined transactions and a further plurality of first outputs generated by the autoencoder network using the plurality of declined transactions and to reduce a further second metric based on the remaining plurality of unlabeled samples and a further plurality of second outputs generated by the autoencoder network using the remaining plurality of unlabeled samples.

Figure 3A:
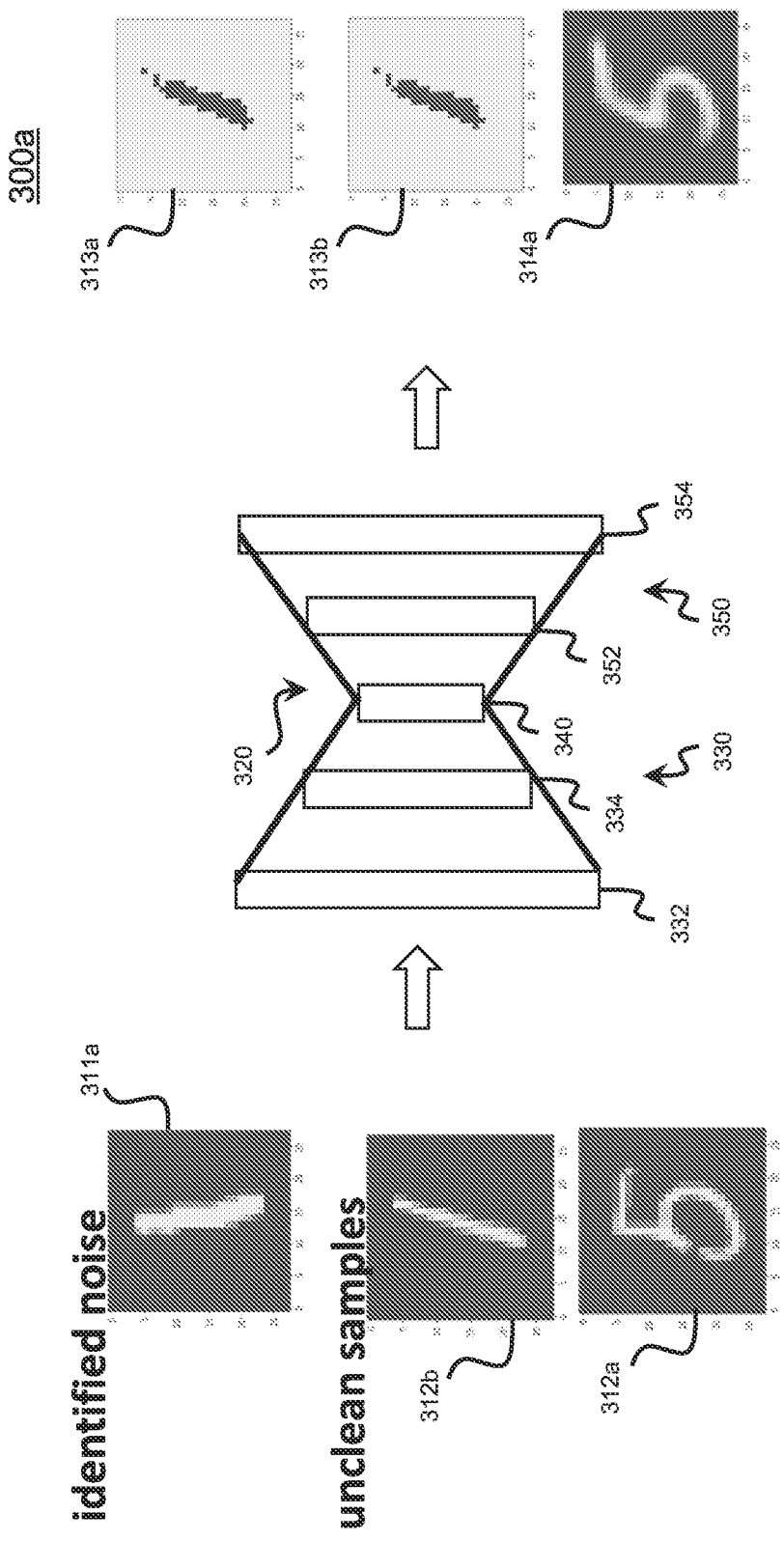
FIG. 3A is a diagram for an exemplary implementation of the systems and methods described herein according to some non-limiting embodiments or aspects.

FIG. 3A depicts an implementation 300a for cleaning noisy data from unlabeled datasets using autoencoders according to some non-limiting embodiments or aspects. As shown in FIG. 3A, implementation 300a includes noisy sample 311a (e.g., one of a plurality of noisy samples), first unlabeled sample 312a (e.g., one of a first plurality of unlabeled samples), second unlabeled sample 312b (e.g., one of a second plurality of unlabeled samples), first noisy reconstructed sample 313a (e.g., one of a first plurality of noisy reconstructed samples), second noisy reconstructed sample 313b (e.g., one of a second plurality of noisy reconstructed samples), clean reconstructed sample 314a (e.g., one of a plurality of noisy clean samples), and autoencoder network 320 (including encoder network 330, input layer 332, hidden layer(s) 334, latent layer 340, decoder network 350, hidden layer(s) 352, and output layer 354). In some non-limiting embodiments or aspects, noisy sample 311a may be the same as or similar to noisy samples 111. In some non-limiting embodiments or aspects, first unlabeled sample 312a and/or second unlabeled sample 312b may be the same as or similar to unlabeled samples 112. In some non-limiting embodiments or aspects, first noisy reconstructed sample 313a and/or second noisy reconstructed sample 313b may be the same as or similar to noisy reconstructed samples 113. In some non-limiting embodiments or aspects, clean reconstructed sample 314a may be the same as or similar to clean reconstructed samples 114. In some non-limiting embodiments or aspects, autoencoder network 320, encoder network 330, input layer 332, hidden layer(s) 334, latent layer 340, decoder network 350, hidden layer(s) 352, and/or output layer 354 may be the same as or similar to autoencoder network 120, encoder network 130, input layer 132, hidden layer(s) 134, latent layer 140, decoder network 150, hidden layer(s) 152, and/or output layer 154. In some non-limiting embodiments or aspects, implementation 300a may be implemented (e.g., completely, partially, and/or the like) by data cleaning system 102. In some non-limiting embodiments or aspects, implementation 300*a* may be implemented (e.g., completely, partially, and/or the like) by another system, another device, another group of systems, or another group of devices, separate from or including data cleaning system 102, such as user device 104, input data database 106, and output data database 108.

In some non-limiting embodiments or aspects, noisy sample 311*a* may include a handwriting sample of a number 1. In some non-limiting embodiments or aspects, second unlabeled sample 312*b* may include a second handwriting sample of a number 1. In some non-limiting embodiments or aspects, first unlabeled sample 312*a* may include a handwriting sample of a number 5. For the purpose of illustration, assume handwriting samples of number 1 are relatively noisy (e.g., non-uniform), and handwriting samples of number 5 are relatively clean. As such, autoencoder network 320 may be trained to maximize a difference between noisy sample 311*a* and first noisy reconstructed sample 313*a* and/or a difference between second unlabeled sample 312*b* and second noisy reconstructed sample 313*b*. Additionally, autoencoder network 320 may be trained to minimize a difference between first unlabeled sample 312*a* and clean reconstructed sample 314*a*.

In some non-limiting embodiments or aspects, autoencoder network 320 may be trained based on noisy samples (e.g., including noisy sample 311*a*) and unlabeled samples (e.g., including first unlabeled sample 312*a* and/or second unlabeled sample 312*b*), as described herein.

In some non-limiting embodiments or aspects, after autoencoder network 320 is trained, autoencoder network 320 may generate outputs (e.g., first noisy reconstructed sample 313*a*, second noisy reconstructed sample 313*b*, and/or clean reconstructed sample 314*a*) based on inputs (e.g., noisy sample 311*a*, second unlabeled sample 312*b*, and/or first unlabeled sample 312*a*, respectively), as described herein. For example, as shown in FIG. 3A, autoencoder network 320 may increase (e.g., maximize) the difference between noisy sample 311*a* and first noisy reconstructed sample 313*a* and/or the difference between second unlabeled sample 312*b* and second noisy reconstructed sample 313*b*. Additionally, autoencoder network 320 may reduce (e.g., minimize) the difference between first unlabeled sample 312*a* and clean reconstructed sample 314*a*.

Figure 3B:
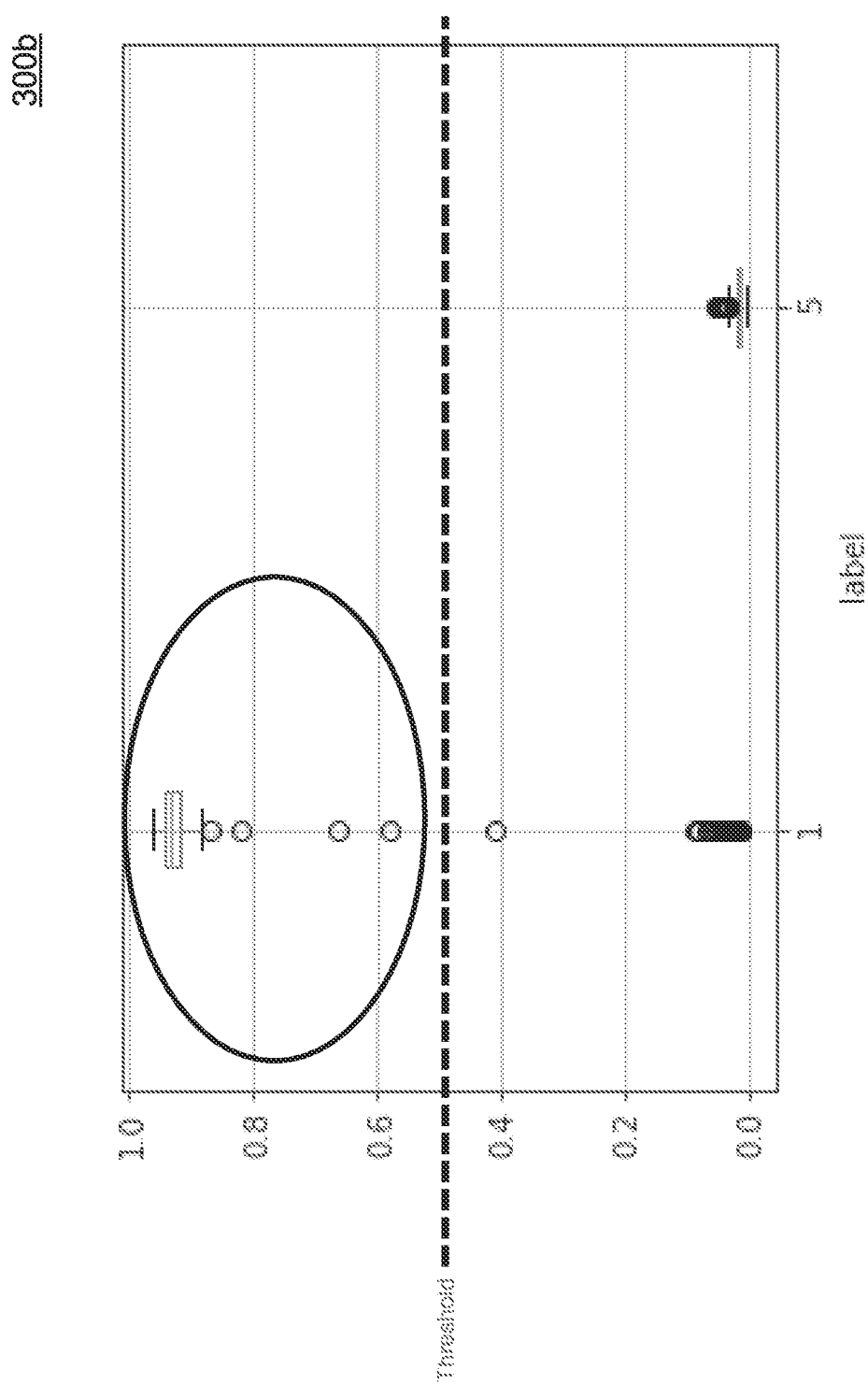
FIG. 3B is a graph for an exemplary metric for the implementation of FIG. 3A according to some non-limiting embodiments or aspects.

FIG. 3B depicts a graph 300*b* for an exemplary metric for implementation 300*a* according to some non-limiting embodiments or aspects. As shown in FIG. 3B, graph 300*b* includes labels for handwriting samples as 1 or 5 on the horizontal axis and the metric on the vertical axis. In some non-limiting embodiments or aspects, the metric may include a normalized score based on the difference between input handwriting samples and outputs on the vertical axis, as described herein.

In some non-limiting embodiments or aspects, the distribution of scores for handwriting samples labeled as number 1 may be relatively spread out, with most scores above the threshold. Accordingly, handwriting samples of the number 1 are mostly noisy.

In some non-limiting embodiments or aspects, the distribution of scores for handwriting samples labeled as number 5 may be relatively condensed, with most scores below the threshold. Accordingly, handwriting samples of the number 5 are mostly clean.

Figure 4:
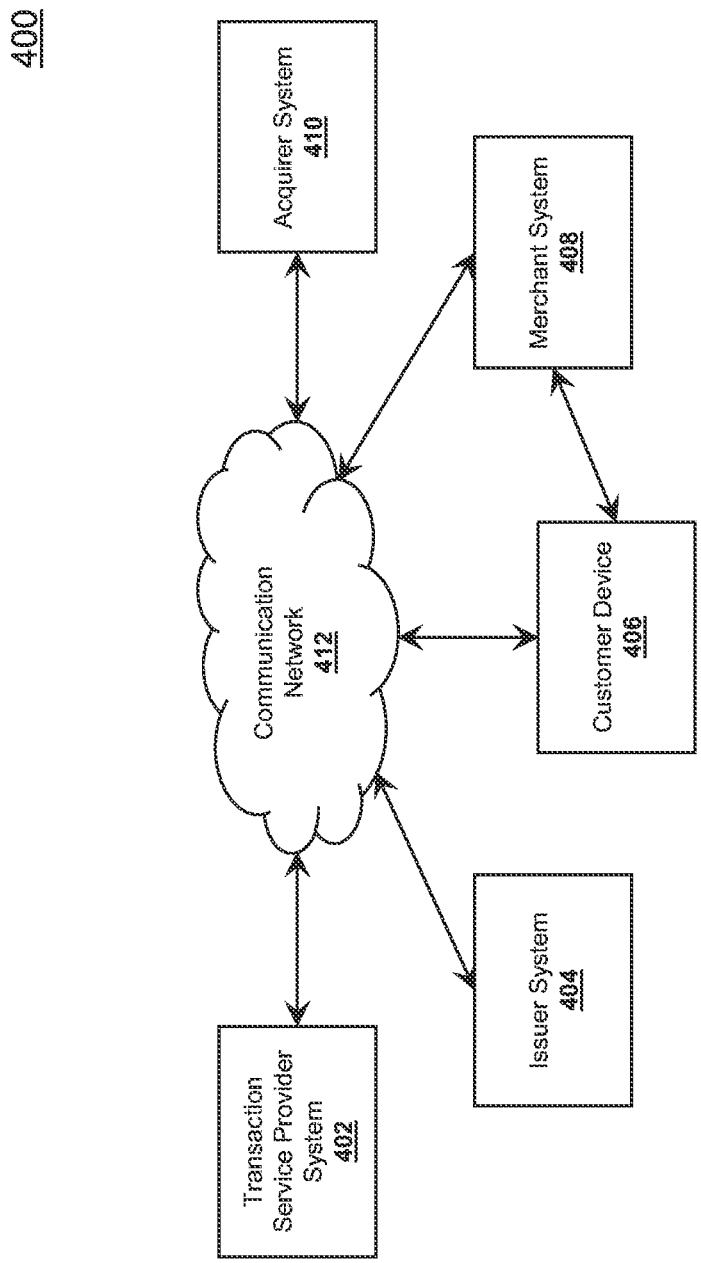
FIG. 4 is a diagram of a non-limiting embodiment or aspect of an environment in which methods, systems, and/or computer program products, described herein, may be implemented according to some non-limiting embodiments or aspects.

Referring now to FIG. 4, FIG. 4 is a diagram of non-limiting embodiments or aspects of an environment 400 in which systems, products, and/or methods, as described herein, may be implemented. As shown in FIG. 4, environment 400 includes transaction service provider system 402, issuer system 404, customer device 406, merchant system 408, acquirer system 410, and communication network 412. In some non-limiting embodiments or aspects, each of data cleaning system 102, user device 104, input data database 106, and/or output data database 108 may be implemented by (e.g., part of) transaction service provider system 402. In some non-limiting embodiments or aspects, at least one of user device 104, input data database 106, and/or output data database 108 may be implemented by (e.g., part of) another system, another device, another group of systems, or another group of devices, separate from or including transaction service provider system 402, such as issuer system 404, merchant system 408, acquirer system 410, and/or the like. For example, user device 104 may be the same as or similar to customer device 406, and/or user device may be implemented by (e.g., part of) issuer system 404, merchant system 408, or acquirer system 410.

Transaction service provider system 402 may include one or more devices capable of receiving information from and/or communicating information to issuer system 404, customer device 406, merchant system 408, and/or acquirer system 410 via communication network 412. For example, transaction service provider system 402 may include a computing device, such as a server (e.g., a transaction processing server), a group of servers, and/or other like devices. In some non-limiting embodiments or aspects, transaction service provider system 402 may be associated with a transaction service provider as described herein. In some non-limiting embodiments or aspects, transaction service provider system 402 may be in communication with a data storage device, which may be local or remote to transaction service provider system 402. In some non-limiting embodiments or aspects, transaction service provider system 402 may be capable of receiving information from, storing information in, communicating information to, or searching information stored in the data storage device.

Issuer system 404 may include one or more devices capable of receiving information and/or communicating information to transaction service provider system 402, customer device 406, merchant system 408, and/or acquirer system 410 via communication network 412. For example, issuer system 404 may include a computing device, such as a server, a group of servers, and/or other like devices. In some non-limiting embodiments or aspects, issuer system 404 may be associated with an issuer institution as described herein. For example, issuer system 404 may be associated with an issuer institution that issued a credit account, debit account, credit card, debit card, and/or the like to a user associated with customer device 406.

Customer device 406 may include one or more devices capable of receiving information from and/or communicating information to transaction service provider system 402, issuer system 404, merchant system 408, and/or acquirer system 410 via communication network 412. Additionally or alternatively, each customer device 406 may include a device capable of receiving information from and/or communicating information to other customer devices 406 via communication network 412, another network (e.g., an ad hoc network, a local network, a private network, a virtual private network, and/or the like), and/or any other suitable communication technique. For example, customer device 406 may include a client device and/or the like. In some non-limiting embodiments or aspects, customer device 406 may or may not be capable of receiving information (e.g., from merchant system 408 or from another customer device 406) via a short-range wireless communication connection (e.g., an NFC communication connection, an RFID communication connection, a Bluetooth® communication connection, a Zigbee® communication connection, and/or the like), and/or communicating information (e.g., to merchant system 408) via a short-range wireless communication connection.

Merchant system 408 may include one or more devices capable of receiving information from and/or communicating information to transaction service provider system 402, issuer system 404, customer device 406, and/or acquirer system 410 via communication network 412. Merchant system 408 may also include a device capable of receiving information from customer device 406 via communication network 412, a communication connection (e.g., an NFC communication connection, an RFID communication connection, a Bluetooth® communication connection, a Zigbee® communication connection, and/or the like) with customer device 406, and/or the like, and/or communicating information to customer device 406 via communication network 412, the communication connection, and/or the like. In some non-limiting embodiments or aspects, merchant system 408 may include a computing device, such as a server, a group of servers, a client device, a group of client devices, and/or other like devices. In some non-limiting embodiments or aspects, merchant system 408 may be associated with a merchant as described herein. In some non-limiting embodiments or aspects, merchant system 408 may include one or more client devices. For example, merchant system 408 may include a client device that allows a merchant to communicate information to transaction service provider system 402. In some non-limiting embodiments or aspects, merchant system 408 may include one or more devices, such as computers, computer systems, and/or peripheral devices capable of being used by a merchant to conduct a transaction with a user. For example, merchant system 408 may include a POS device and/or a POS system.

Acquirer system 410 may include one or more devices capable of receiving information from and/or communicating information to transaction service provider system 402, issuer system 404, customer device 406, and/or merchant system 408 via communication network 412. For example, acquirer system 410 may include a computing device, a server, a group of servers, and/or the like. In some non-limiting embodiments or aspects, acquirer system 410 may be associated with an acquirer as described herein.

Communication network 412 may include one or more wired and/or wireless networks. For example, communication network 412 may include a cellular network (e.g., a long-term evolution (LTE) network, a third generation (4G) network, a fourth generation (4G) network, a fifth generation (5G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network (e.g., a private network associated with a transaction service provider), an ad hoc network, an intranet, the Internet, a fiber optic-based network, a cloud computing network, and/or the like, and/or a combination of these or other types of networks.

In some non-limiting embodiments or aspects, processing a transaction may include generating and/or communicating at least one transaction message (e.g., authorization request, authorization response, any combination thereof, and/or the like). For example, a client device (e.g., customer device 406, a POS device of merchant system 408, and/or the like) may initiate the transaction, e.g., by generating an authorization request. Additionally or alternatively, the client device (e.g., customer device 406, at least one device of merchant system 408, and/or the like) may communicate the authorization request. For example, customer device 406 may communicate the authorization request to merchant system 408 and/or a payment gateway (e.g., a payment gateway of transaction service provider system 402, a third-party payment gateway separate from transaction service provider system 402, and/or the like). Additionally or alternatively, merchant system 408 (e.g., a POS device thereof) may communicate the authorization request to acquirer system 410 and/or a payment gateway. In some non-limiting embodiments or aspects, acquirer system 410 and/or a payment gateway may communicate the authorization request to transaction service provider system 402 and/or issuer system 404. Additionally or alternatively, transaction service provider system 402 may communicate the authorization request to issuer system 404. In some non-limiting embodiments or aspects, issuer system 404 may determine an authorization decision (e.g., authorize, decline, and/or the like) based on the authorization request. For example, the authorization request may cause issuer system 404 to determine the authorization decision based thereof. In some non-limiting embodiments or aspects, issuer system 404 may generate an authorization response based on the authorization decision. Additionally or alternatively, issuer system 404 may communicate the authorization response. For example, issuer system 404 may communicate the authorization response to transaction service provider system 402 and/or a payment gateway. Additionally or alternatively, transaction service provider system 402 and/or a payment gateway may communicate the authorization response to acquirer system 410, merchant system 408, and/or customer device 406. Additionally or alternatively, acquirer system 410 may communicate the authorization response to merchant system 408 and/or a payment gateway. Additionally or alternatively, a payment gateway may communicate the authorization response to merchant system 408 and/or customer device 406. Additionally or alternatively, merchant system 408 may communicate the authorization response to customer device 406. In some non-limiting embodiments or aspects, merchant system 408 may receive (e.g., from acquirer system 410 and/or a payment gateway) the authorization response. Additionally or alternatively, merchant system 408 may complete the transaction based on the authorization response (e.g., provide, ship, and/or deliver goods and/or services associated with the transaction; fulfill an order associated with the transaction; any combination thereof; and/or the like).

For the purpose of illustration, processing a transaction may include generating a transaction message (e.g., authorization request and/or the like) based on an account identifier of a customer (e.g., associated with customer device 406 and/or the like) and/or transaction data associated with the transaction. For example, merchant system 408 (e.g., a client device of merchant system 408, a POS device of merchant system 408, and/or the like) may initiate the transaction, e.g., by generating an authorization request (e.g., in response to receiving the account identifier from a portable financial device of the customer and/or the like). Additionally or alternatively, merchant system 408 may communicate the authorization request to acquirer system 410. Additionally or alternatively, acquirer system 410 may communicate the authorization request to transaction service provider system 402. Additionally or alternatively, transaction service provider system 402 may communicate the authorization request to issuer system 404. Issuer system 404 may determine an authorization decision (e.g., authorize, decline, and/or the like) based on the authorization request, and/or issuer system 404 may generate an authorization response based on the authorization decision and/or the authorization request. Additionally or alternatively, issuer system 404 may communicate the authorization response to transaction service provider system 402. Additionally or alternatively, transaction service provider system 402 may communicate the authorization response to acquirer system 410, which may communicate the authorization response to merchant system 408.

For the purpose of illustration, clearing and/or settlement of a transaction may include generating a message (e.g., clearing message, settlement message, and/or the like) based on an account identifier of a customer (e.g., associated with customer device 406 and/or the like) and/or transaction data associated with the transaction. For example, merchant system 408 may generate at least one clearing message (e.g., a plurality of clearing messages, a batch of clearing messages, and/or the like). Additionally or alternatively, merchant system 408 may communicate the clearing message(s) to acquirer system 410. Additionally or alternatively, acquirer system 410 may communicate the clearing message(s) to transaction service provider system 402. Additionally or alternatively, transaction service provider system 402 may communicate the clearing message(s) to issuer system 404. Additionally or alternatively, issuer system 404 may generate at least one settlement message based on the clearing message(s). Additionally or alternatively, issuer system 404 may communicate the settlement message(s) and/or funds to transaction service provider system 402 (and/or a settlement bank system associated with transaction service provider system 402). Additionally or alternatively, transaction service provider system 402 (and/or the settlement bank system) may communicate the settlement message(s) and/or funds to acquirer system 410, which may communicate the settlement message(s) and/or funds to merchant system 408 (and/or an account associated with merchant system 408).

The number and arrangement of systems, devices, and/or networks shown in FIG. 4 are provided as an example. There may be additional systems, devices, and/or networks; fewer systems, devices, and/or networks; different systems, devices, and/or networks; and/or differently arranged systems, devices, and/or networks than those shown in FIG. 4. Furthermore, two or more systems or devices shown in FIG. 4 may be implemented within a single system or device, or a single system or device shown in FIG. 4 may be implemented as multiple distributed systems or devices. Additionally or alternatively, a set of systems (e.g., one or more systems) or a set of devices (e.g., one or more devices) of environment 400 may perform one or more functions described as being performed by another set of systems or another set of devices of environment 400.

Figure 5:
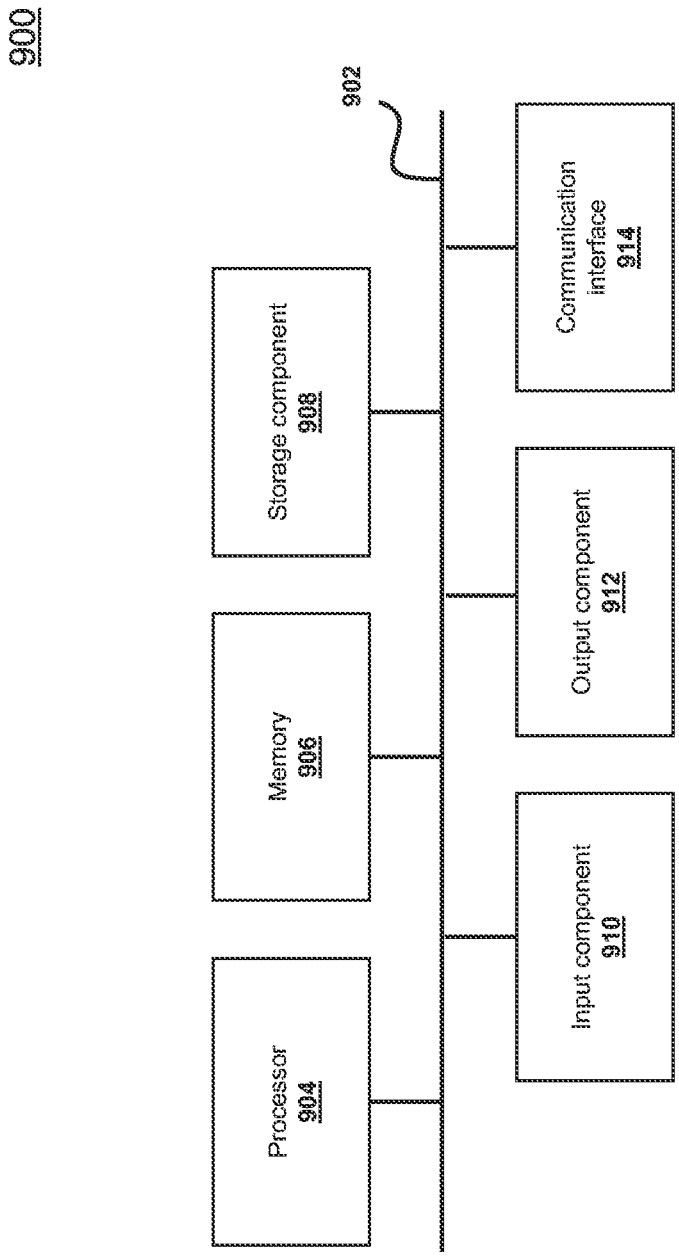
FIG. 5 illustrates example components of a device used in connection with non-limiting embodiments or aspects.

Referring now to FIG. 5, shown is a diagram of example components of a device 900 according to non-limiting embodiments or aspects. Device 900 may correspond to data cleaning system 102, user device 104, input data database 106, and/or output data database 108 in FIG. 1 and/or transaction service provider system 402, issuer system 404, customer device 406, merchant system 408, and/or acquirer system 410 in FIG. 4, as an example. In some non-limiting embodiments or aspects, such systems or devices may include at least one device 900 and/or at least one component of device 900. The number and arrangement of components shown are provided as an example. In some non-limiting embodiments or aspects, device 900 may include additional components, fewer components, different components, or differently arranged components than those shown in FIG. 5. Additionally or alternatively, a set of components (e.g., one or more components) of device 900 may perform one or more functions described as being performed by another set of components of device 900.

As shown in FIG. 5, device 900 may include bus 902, processor 904, memory 906, storage component 908, input component 910, output component 912, and communication interface 914. Bus 902 may include a component that permits communication among the components of device 900. In some non-limiting embodiments or aspects, processor 904 may be implemented in hardware, software, or a combination of hardware and software. For example, processor 904 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 906 may include random access memory (RAM), read only memory (ROM), and/or another type of dynamic or static storage device (e.g., flash memory, magnetic memory, optical memory, etc.) that stores information and/or instructions for use by processor 904.

With continued reference to FIG. 5, storage component 908 may store information and/or software related to the operation and use of device 900. For example, storage component 908 may include a hard disk (e.g., a magnetic disk, an optical disk, a magneto-optic disk, a solid state disk, etc.) and/or another type of computer-readable medium. Input component 910 may include a component that permits device 900 to receive information, such as via user input (e.g., a touch screen display, a keyboard, a keypad, a mouse, a button, a switch, a microphone, etc.). Additionally, or alternatively, input component 910 may include a sensor for sensing information (e.g., a global positioning system (GPS) component, an accelerometer, a gyroscope, an actuator, etc.). Output component 912 may include a component that provides output information from device 900 (e.g., a display, a speaker, one or more light-emitting diodes (LEDs), etc.). Communication interface 914 may include a transceiver-like component (e.g., a transceiver, a separate receiver and transmitter, etc.) that enables device 900 to communicate with other devices, such as via a wired connection, a wireless connection, or a combination of wired and wireless connections. Communication interface 914 may permit device 900 to receive information from another device and/or provide information to another device. For example, communication interface 914 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 900 may perform one or more processes described herein. Device 900 may perform these processes based on processor 904 executing software instructions stored by a computer-readable medium, such as memory 906 and/or storage component 908. A computer-readable medium may include any non-transitory memory device. A non-transitory memory device includes memory space located inside of a single physical storage device or memory space spread across multiple physical storage devices. Software instructions may be read into memory 906 and/or storage component 908 from another computer-readable medium or from another device via communication interface 914. When executed, software instructions stored in memory 906 and/or storage component 908 may cause processor 904 to perform one or more processes described herein. Additionally or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

Although embodiments or aspects have been described in detail for the purpose of illustration, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A computer-implemented method, comprising:
   receiving, with at least one processor, training data comprising a plurality of noisy samples labeled as noisy and a plurality of other samples not labeled as noisy;
   training, with at least one processor, an autoencoder network based on the training data to increase a first metric based on the plurality of noisy samples and a plurality of first outputs generated by the autoencoder network using the plurality of noisy samples and to reduce a second metric based on the plurality of other samples and a plurality of second outputs generated by the autoencoder network using the plurality of other samples;
   receiving, with at least one processor, unlabeled data comprising a plurality of unlabeled samples;
   generating, with at least one processor, a plurality of third outputs by the autoencoder network based on the plurality of unlabeled samples;
   for each respective unlabeled sample of the plurality of unlabeled samples, determining, with at least one processor, a respective third metric based on the respective unlabeled sample and a respective third output of the plurality of third outputs;
   for each respective unlabeled sample of the plurality of unlabeled samples, determining, with at least one processor, whether to label the respective unlabeled sample as noisy or clean based on the respective third metric and a threshold; and
   for each respective unlabeled sample determined to be labeled as noisy, cleaning, with at least one processor, the respective unlabeled sample.

2. The method of claim 1, wherein the plurality of other samples comprises a plurality of clean samples labeled as clean.

3. The method of claim 1, wherein the plurality of other samples comprises a subset of the plurality of unlabeled samples.

4. The method of claim 1, wherein the plurality of other samples comprises a second plurality of unlabeled samples, the method further comprising:
   labeling, with at least one processor, the second plurality of unlabeled samples as clean.

5. The method of claim 1, wherein the autoencoder network comprises a min-max adversarial hybrid autoencoder.

6. The method of claim 1, wherein training the autoencoder network comprises training the autoencoder network to maximize a difference between the plurality of noisy samples and the plurality of first outputs and to minimize a difference between the plurality of other samples and the plurality of second outputs.

7. The method of claim 1, wherein training the autoencoder network comprises:
   determining a negative mean squared error based on the plurality of noisy samples and the plurality of first outputs as a first component of loss; and
   determining a mean squared error based on the plurality of other samples and the plurality of second outputs as a second component of loss.

8. The method of claim 1, wherein the third metric comprises a difference between each respective unlabeled sample and the respective third output, and
   wherein determining whether to label the respective unlabeled sample as noisy or clean comprises:
     determining to label the respective unlabeled sample as noisy if the difference exceeds the threshold; or
     determining to label the respective unlabeled sample as clean if the difference does not exceed the threshold.

9. The method of claim 1, wherein cleaning the respective unlabeled sample comprises at least one of:
   discarding the respective unlabeled sample;
   setting a respective flag indicating that the respective unlabeled sample is determined to be labeled as noisy;
   labeling the respective unlabeled sample as noisy;
   communicating a score based on the metric for the respective unlabeled sample;
   communicating report data based on determining whether to label each respective unlabeled sample as noisy or clean; or
   any combination thereof.

10. The method of claim 1, wherein the plurality of noisy samples comprises a plurality of declined transactions, the plurality of other samples comprises a first plurality of approved transactions, and the plurality of unlabeled samples comprises a second plurality of approved transactions,
    wherein determining whether to label each respective unlabeled sample as noisy or clean comprises determining whether to label each respective unlabeled sample as declined or approved, respectively,
    wherein cleaning each respective unlabeled sample determined to be labeled as noisy comprises discarding the respective unlabeled sample, and
    wherein a remaining plurality of unlabeled samples comprises each respective unlabeled sample determined to be labeled as clean.

11. The method of claim 10, further comprising:
    retraining, with at least one processor, the autoencoder network to increase a further first metric based on the plurality of declined transactions and a further plurality of first outputs generated by the autoencoder network using the plurality of declined transactions and to reduce a further second metric based on the remaining plurality of unlabeled samples and a further plurality of second outputs generated by the autoencoder network using the remaining plurality of unlabeled samples.

12. The method of claim 1, wherein receiving the training data comprises receiving the training data from a user device; and wherein receiving the unlabeled data comprises receiving the unlabeled data from the user device.

13. The method of claim 12, wherein cleaning comprises:
generating report data based on determining whether to label each respective unlabeled sample as noisy or clean; and
communicating the report data to the user device.

14. A system, comprising:
a data cleaning system configured to:
receive training data comprising a plurality of noisy samples labeled as noisy and a plurality of other samples not labeled as noisy;
train an autoencoder network based on the training data to increase a first metric based on the plurality of noisy samples and a plurality of first outputs generated by the autoencoder network using the plurality of noisy samples and to reduce a second metric based on the plurality of other samples and a plurality of second outputs generated by the autoencoder network using the plurality of other samples;
receive unlabeled data comprising a plurality of unlabeled samples;
generate a plurality of third outputs by the autoencoder network based on the plurality of unlabeled samples;
for each respective unlabeled sample of the plurality of unlabeled samples, determine a respective third metric based on the respective unlabeled sample and a respective third output of the plurality of third outputs;
for each respective unlabeled sample of the plurality of unlabeled samples, determine whether to label the respective unlabeled sample as noisy or clean based on the respective third metric and a threshold; and
for each respective unlabeled sample determined to be labeled as noisy, clean the respective unlabeled sample.

15. The system of claim 14, further comprising:
an input data database configured to:
receive the training data from a user device;
receive the unlabeled data from the user device; and
communicate the training data and the unlabeled data to the data cleaning system.

16. The system of claim 14, wherein cleaning comprises generating report data based on determining whether to label each respective unlabeled sample as noisy or clean and communicating the report data.

17. The system of claim 16, further comprising:
an output data database configured to:
receive the report data from the data cleaning system; and
communicate the report data to a user device.

18. The system of claim 14, wherein the data cleaning system comprises part of a transaction service provider system, and
wherein a user device comprises part of an issuer system.

19. A computer program product comprising at least one non-transitory computer-readable medium including one or more instructions that, when executed by at least one processor, cause the at least one processor to:
receive training data comprising a plurality of noisy samples labeled as noisy and a plurality of other samples not labeled as noisy;
train an autoencoder network based on the training data to increase a first metric based on the plurality of noisy samples and a plurality of first outputs generated by the autoencoder network using the plurality of noisy samples and to reduce a second metric based on the plurality of other samples and a plurality of second outputs generated by the autoencoder network using the plurality of other samples;
receive unlabeled data comprising a plurality of unlabeled samples;
generate a plurality of third outputs by the autoencoder network based on the plurality of unlabeled samples;
for each respective unlabeled sample of the plurality of unlabeled samples, determine a respective third metric based on the respective unlabeled sample and a respective third output of the plurality of third outputs;
for each respective unlabeled sample of the plurality of unlabeled samples, determine whether to label the respective unlabeled sample as noisy or clean based on the respective third metric and a threshold; and
for each respective unlabeled sample determined to be labeled as noisy, clean the respective unlabeled sample.

20. The computer program product of claim 19, wherein the plurality of noisy samples comprises a plurality of declined transactions, the plurality of other samples comprises a first plurality of approved transactions, and the plurality of unlabeled samples comprises a second plurality of approved transactions.

* * * * *